US011761110B2

(12) United States Patent
Jin et al.

(10) Patent No.: US 11,761,110 B2
(45) Date of Patent: Sep. 19, 2023

(54) PHOTOANODE FILM FOR THE PHOTOCATHODE PROTECTION AND THE DURABILITY IMPROVEMENT OF A REINFORCING BAR IN CONCRETES, THE PREPARATION METHOD THEREOF AND A METHOD OF USING THE PHOTOANODE FILM FOR THE PHOTOCATHODE PROTECTION AND THE DURABILITY IMPROVEMENT OF A REINFORCING BAR IN CONCRETES

(71) Applicant: Qingdao University of Technology, Qingdao (CN)

(72) Inventors: Zuquan Jin, Qingdao (CN); Xiaoying Zhang, Qingdao (CN); Jihong Jiang, Qingdao (CN); Zhaoyi Chen, Qingdao (CN); Pengcheng Ren, Qingdao (CN); Xiaoqing Wang, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 17/837,131

(22) Filed: Jun. 10, 2022

(65) Prior Publication Data

US 2023/0227993 A1  Jul. 20, 2023

(30) Foreign Application Priority Data

Jan. 18, 2022  (CN) .......................... 202210053172.X

(51) Int. Cl.
C25D 9/08 (2006.01)
C03C 17/42 (2006.01)
(Continued)

(52) U.S. Cl.
CPC ................ *C25D 9/08* (2013.01); *C03C 17/42* (2013.01); *C23F 13/12* (2013.01); *C23F 13/20* (2013.01);
(Continued)

(58) Field of Classification Search
CPC ...... C25D 9/08; C03C 17/42; C03C 2218/111
See application file for complete search history.

(56) References Cited

U.S. PATENT DOCUMENTS 6,440,332 B1   8/2002  Geer et al.
2008/0314766 A1*  12/2008  Alocilja ........... G01N 33/56916
204/403.01

FOREIGN PATENT DOCUMENTS

CN    1564355 A  *  1/2005
CN    1624200 A     6/2005
(Continued)

OTHER PUBLICATIONS

Deshmukh et al. "Inexpensive synthesis route of porous polyaniline-ruthenium oxide composite for supercapacitor application" Chemical Engineering Journal 257 (2014) 82-89 (Year: 2014).*
(Continued)

*Primary Examiner* — Nathan H Empie

(57) ABSTRACT

The present invention relates to a Z-type heterojunction photoanode film used for the photocathode protection of a reinforcing bar, the preparation method thereof and a method for the corrosion inhibition of mental materials from concrete structures in marine engineering by using the Z-type heterojunction photoanode film used for the photocathode protection of a reinforcing bar. The preparation method includes steps of preparing $Fe_2O_3$ on the conducting surface of a clean conductive substrate through the hydrothermal process, preparing $Fe_2O_3$-PANI composite photoanode film by depositing polyaniline on the surface of $Fe_2O_3$ through the electrochemical synthesis and preparing
(Continued)

$Ru-Fe_2O_3$-PANI composite photoanode film on the surface of the $Fe_2O_3$-PANI composite photoanode film through the in situ chemical reduction method. The technical solution in the present invention can achieve highly effective photocathode protection of a reinforcing bar from concretes in marine engineering and improve the durability of concrete structures in marine engineering.

5 Claims, 4 Drawing Sheets

(51) Int. Cl.
  *C23F 13/12* (2006.01)
  *C23F 13/20* (2006.01)
(52) U.S. Cl.
  CPC .. *C03C 2217/217* (2013.01); *C03C 2217/231* (2013.01); *C03C 2217/254* (2013.01); *C03C 2217/78* (2013.01); *C03C 2218/111* (2013.01); *C23F 2201/02* (2013.01)

(56) References Cited

FOREIGN PATENT DOCUMENTS

| CN | 103613755 | A | * | 3/2014 |
| CN | 105140597 | A | * | 12/2015 |
| CN | 108411309 | A | | 8/2018 |
| CN | 112823885 | A | | 5/2021 |
| CN | 113293381 | A | | 8/2021 |
| CN | 113755861 | A | | 12/2021 |

OTHER PUBLICATIONS

Xia et al. "Nanostructured ternary composites of graphene/ Fe2O3/ polyaniline for high performance supercapacitors" J. Mater. Chem., 2012,22,16844 (Year: 2012).*

Xiaoxia Han, "Preparation and Properties of Conductive Polymer Polyaniline Composite Coatings", China Excellent Doctoral and Master's Thesis Full-text Database (Master), Engineering Science and Technology vol. 1, Jun. 15, 2020, pp. B022-185.

* cited by examiner

PHOTOANODE FILM FOR THE PHOTOCATHODE PROTECTION AND THE DURABILITY IMPROVEMENT OF A REINFORCING BAR IN CONCRETES, THE PREPARATION METHOD THEREOF AND A METHOD OF USING THE PHOTOANODE FILM FOR THE PHOTOCATHODE PROTECTION AND THE DURABILITY IMPROVEMENT OF A REINFORCING BAR IN CONCRETES

CROSS-REFERENCE TO RELATED APPLICATIONS

This application claims priority to Chinese Application No. 202210053172.X, filed on Jan. 18, 2022, entitled A Photoanode Film for the Photocathode Protection and the Durability Improvement of a Reinforcing Bar in Concretes, the Preparation Method thereof and A Method of Using the Photoanode Film for the Photocathode Protection and the Durability Improvement of a Reinforcing Bar in Concretes. These contents are hereby incorporated by reference.

TECHNICAL FIELD

The invention belongs to the technical field of corrosion inhibition for metal materials from concrete structures in marine engineering, particularly relates to a Z-type heterojunction photoanode film for the photocathode protection of a reinforcing bar, the preparation method thereof and the method of applying thereof in improving durability for a reinforcing bar in concretes in marine engineering.

BACKGROUND

With the development of economy, marine resources are increasingly exploited and more and more concrete buildings are built in the marine environment. Concrete structures under special environment of high temperature and high salt from marine engineering and nearshore constructions are more likely to be corroded and destroyed. Once the concrete building is destroyed, the maintenance will be very troublesome or it will even be beyond maintenance. In view of economic, resource and safety factors, corrosion and destruction resistance and improvement on the durability of concrete structures have become the focus of civil engineering researches, which means the anti-corrosion work of concrete structures in marine engineering is particularly important.

The cathode protection technology is an economical and effective protection measure for concrete structures in marine engineering, which can be divided into the sacrificial anode cathode protection and the impressed current cathode protection. The former adopts magnesium or zinc with a potential lower than that of a reinforcing bar as the anode, thereby protecting the reinforcing bar through its own corrosion. The latter directly connects the cathode of DC power supply to a protected reinforcing bar and connects the positive electrode to an insoluble auxiliary anode so as to provide a protective current, thereby protecting the reinforcing bar from cathodic polarization. The cathode protection technology has been widely applied in the field of corrosion protection for concrete structures in marine engineering, but it is still faced with some problems such as loss of a sacrificial anode, energy consumption and environmental pollution and so on. The photocathode protection is a new protection technology and it has achieved good results in the metal protection field. However, at present, most of the semiconductor materials used in photoanodes for photocathode protection are ultraviolet responsive, which cannot match well with the solar spectrum, disabling it from exploiting the solar energy effectively. More importantly, the conduction band potential of the photoanode semiconductor material is not low enough, disabling the photogenerated electrons from transferring quickly or completely disabling them from transferring to the protected reinforcing bar, resulting in poor effect for the photoelectric chemical cathode protection.

In recent years, polyaniline (PANI) as a conductive polymer material has become one of conductive polymer materials under the most advanced researches due to its properties such as excellent electrical conductivity, chemical stability, electrochemical reversibility, excellent photoelectric performance and simple synthesis method. More importantly, the potential for the position of the lowest unoccupied molecular orbital (LUMO) of PANI is relatively low, which enables it to provide cathode protection current for a reinforcing bar from the thermodynamic perspective. However, it has low photoelectron-hole separation efficiency and shows poor effect for cathode protection.

Therefore, there exists a need for an improved technical solution with regard to the above-mentioned defects in the prior art.

SUMMARY OF THE INVENTION

The purpose of the invention is to provide a Z-type heterojunction photoanode film used for the photocathode protection of a reinforcing bar, the preparation method thereof and the method of applying thereof in improving durability for a reinforcing bar in concretes so as to solve the problems existing in the prior art.

For the purpose of achieving the above targets, the present invention provides the following technical solutions:

A method of preparing Z-type heterojunction photoanode film used for the photocathode protection of a reinforcing bar including the following steps:

Step 1, preparing $Fe_2O_3$ on the conducting surface of a clean conductive substrate through the hydrothermal process where the ferric salt and carbamide act as the starting materials, Step 2, preparing $Fe_2O_3$-PANI composite photoanode film by depositing polyaniline on the surface of $Fe_2O_3$ through the electrochemical synthesis, Step 3, preparing Ru-$Fe_2O_3$-PANI composite photoanode film on the surface of the $Fe_2O_3$-PANI composite photoanode film through the in situ chemical reduction method.

According to the above preparation method, optionally, in Step 1, the ferric salt is a ferrous inorganic salt or organic salt; in Step 1, the conductive substrate is FTO conductive glass, the clean FTO conductive glass is washed by the following steps: putting the FTO conductive glass into detergent-containing aqueous solution, NaOH-saturated ethanol solution, ethanol solution and deionized water in sequence for ultrasonic cleaning, washing and drying the FTO conductive glass to obtain the clean FTO conductive glass.

According to the above preparation method, optionally, Step 1 is specifically performed as adding the mixture solution of the ferric salt and carbamide into the reactor, adding a strong alkali into the reactor to adjust pH of the mixture solution, putting the clean conductive substrate into the mixture solution with the conducting surface down, heating the mixture solution for hydrothermal reaction, taking out the conductive substrate out of the reactor after the reactor is cooled down, washing and drying the conductive substrate to obtain $Fe_2O_3$ on the conducting surface of the conductive substrate.

According to the above preparation method, optionally, the concentration of the ferric salt is 0.05 mmol/L~0.8 mmol/L, the concentration of carbamide is 0.1 mmol/L~0.8 mmol/L; the concentration ratio of the ferric salt to carbamide is 1:1~1:2, pH of the mixture solution after adjustment is 9~11, the temperature of the hydrothermal reaction is 90~200° C. and the period of the hydrothermal reaction is 8~24 h.

Step 2 is specifically performed as adding aniline-water solution into an electrolytic tank, adding a strong acid into the electrolytic tank to adjust pH of the solution to obtain the electrochemical synthesis solution, conducting the potentiostatic polymerization in the electrochemical synthesis solution by using a three-electrode system where the $Fe_2O_3$ conductive substrate obtained in Step 1 acts as the working electrode and Ag/AgCl and Pt respectively act as the reference electrode and the counter electrode, thereby preparing $Fe_2O_3$-PANI composite photoanode film.

In Step 2, the concentration of aniline-water solution is 1 mmol/L~10 mmol/L, the concentration ratio of the aniline-water solution to the ferric salt is 1:20 or 1:10, pH of the solution after adjustment is 1~5; the potential of the potentiostatic polymerization is 0.8·3.0V and the period of the potentiostatic polymerization is 10~50 min.

Step 3 is specifically performed as: repeating operations of dropping or spin-coating $RuCl_3$ aqueous solution on the surface of the $Fe_2O_3$-PANI composite photoanode film, immersing the composite photoanode film dropped or spin-coated with the $RuCl_3$ aqueous solution into $KBH_4$ aqueous solution and taking the immersed composite photoanode film out of the $KBH_4$ aqueous solution in a loop, finally washing and drying the obtained composite photoanode film to obtain Ru-$Fe_2O_3$-PANI composite photoanode film.

In Step 3, the concentration of $RuCl_3$ aqueous solution is 0.01 mmol/L~0.5 mol/L, the concentration ratio of the $RuCl_3$ aqueous solution to the ferric salt is 8:5~10:1; the concentration of $KBH_4$ aqueous solution is 0.1 mol/L~0.8 mol/L, the concentration ratio of the $KBH_4$ aqueous solution to ferric salt is 1:2~5:3; the period for each immersion in the $KBH_4$ aqueous solution is 3~5 s and the operations are repeated in a loop for 2~20 times.

The present invention also provides a Z-type heterojunction photoanode film used for the photocathode protection of a reinforcing bar prepared by the above method of preparing Z-type heterojunction photoanode film used for the photocathode protection of a reinforcing bar.

The present invention also provides a method for the photoelectric protection of a reinforcing bar from concrete structures in marine engineering by using the above Z-type heterojunction photoanode film used for the photocathode protection of a reinforcing bar as a photoanode covering film.

Beneficial effects:

The present invention prominently improves the light absorption and utilization efficiency and increases the efficiency of separating photogenerated electrons by using the Ru-$Fe_2O_3$-PANI composite film as the photoanode film for the cathode protection of concrete structures in marine engineering. Reasons for the adoption of polyaniline in the present invention lie in two aspects, one of which is that the match of its energy band structure and $Fe_2O_3$ energy band structure enables the construction of Z type electron transfer heterojunction which not only increases the efficiency of separating photogenerated electrons but also maintains a comparatively low conduction band potential and further contributes to the transfer of photogenerated electrons from the photoanode to the surface of a reinforcing bar, the other of which is that the excellent conductivity of polyaniline can provide transfer network for photogenerated electrons and enhances the separation and transfer of photogenerated electrons. The introduction of Ru quantum dots contributes to the charge recombination of electron holes on PANI valence band of a composite film and electrons on $Fe_2O_3$ conduction band, facilitating the formation of the Z type electron transfer pathway. The organic-inorganic Ru-$Fe_2O_3$-PANI composite film in the present invention can achieve highly effective photocathode protection of a reinforcing bar from concretes in marine engineering and improve the durability of concrete structures in marine engineering by the construction of Z type heterojunction and the introduction of Ru quantum dots.

BRIEF DESCRIPTION OF DRAWINGS

The drawings forming part of the invention are intended to provide further understanding of the present invention, and schematic examples of the present invention and their descriptions are intended to explain the present invention and do not constitute undue definition of the present invention. Among them.

DETAILED DESCRIPTION OF PREFERRED EXAMPLES

Figure 1:
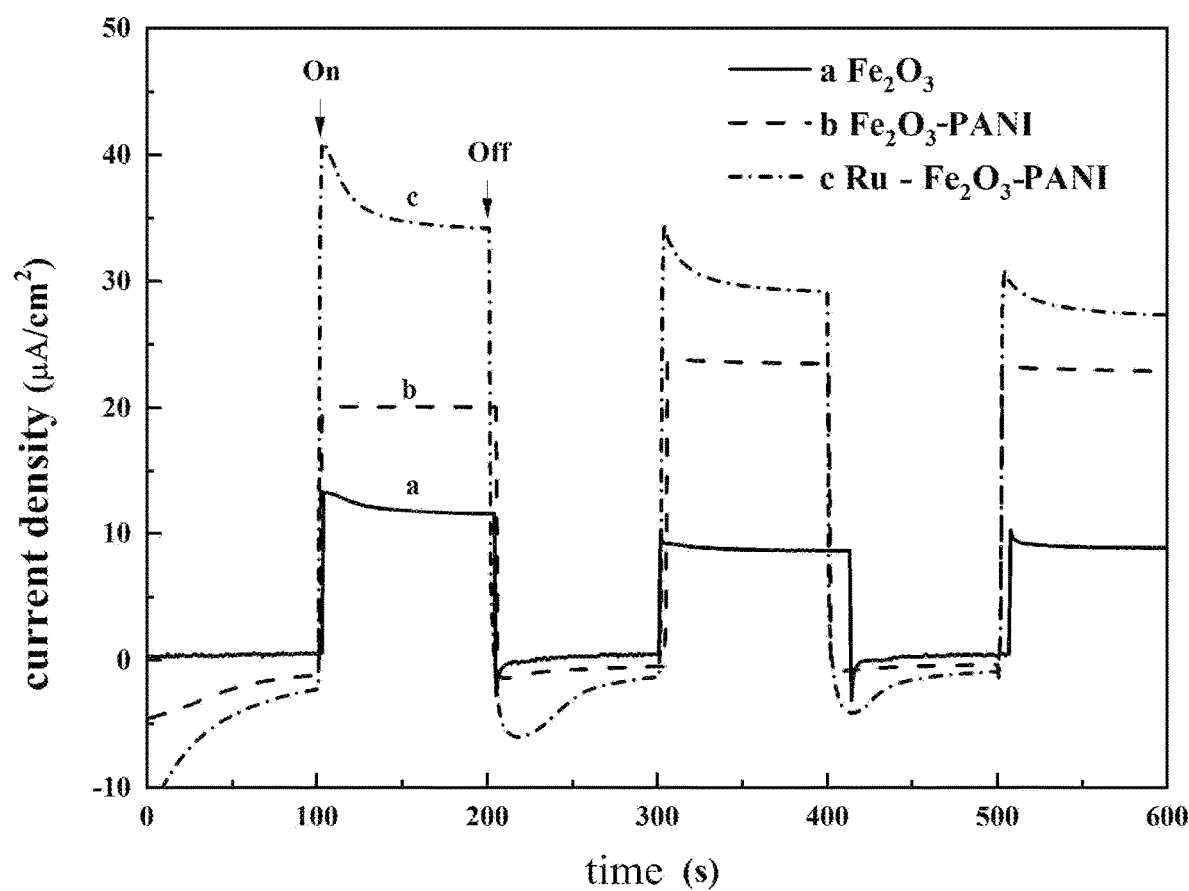
FIG. 1 is the photoinduced current-time curve for $Fe_2O_3$, $Fe_2O_3$-PANI composite photoanode film and Ru-$Fe_2O_3$-PANI composite photoanode film under intermittent light irradiation in example 1 of the present invention.

Now each Example in the present application is further described in combination with the drawings.

With regard to the problems existing in the prior art, the present invention provides a Ru-$Fe_2O_3$-PANI composite photoanode film for the photocathode protection of a reinforcing bar, the preparation method thereof and the method of applying thereof in improving durability for a reinforcing bar in concretes of marine engineering.

The method of preparing Z-type heterojunction photoanode film used for the photocathode protection of a reinforcing bar in the present invention includes the following steps:

Step 1, preparing $Fe_2O_3$ on the conducting surface of a clean conductive substrate through the hydrothermal process where the ferric salt and carbamide act as the starting materials, Step 2, preparing $Fe_2O_3$-PANI composite photoanode film by depositing polyaniline on the surface of $Fe_2O_3$ through the electrochemical synthesis, Step 3, preparing Ru-Fe$_2$O$_3$-PANI composite photoanode film on the surface of the Fe$_2$O$_3$-PANI composite photoanode film through the in situ chemical reduction method.

The present invention prominently improves the light absorption and utilization efficiency and increases the efficiency of separating photogenerated electrons by using the Ru-Fe$_2$O$_3$-PANI composite film as the photoanode film for the cathode protection of concrete structures in marine engineering. Reasons for the adoption of polyaniline in the present invention lie in two aspects, one of which is that the match of its energy band structure and Fe$_2$O$_3$ energy band structure enables the construction of Z type electron transfer heterojunction which not only increases the efficiency of separating photogenerated electrons but also maintains a comparatively low conduction band potential and further contributes to the transfer of photogenerated electrons from the photoanode to the surface of a reinforcing bar, the other of which is that the excellent conductivity of polyaniline can provide transfer network for photogenerated electrons and enhances the separation and transfer of photogenerated electrons. The introduction of Ru quantum dots contributes to the charge recombination of electron holes on PANI valence band of a composite film and electrons on Fe$_2$O$_3$ conduction band, facilitating the formation of the Z type electron transfer pathway. The organic-inorganic Ru-Fe$_2$O$_3$-PANI composite film in the present invention can achieve highly effective photocathode protection of a reinforcing bar from concretes in marine engineering and improve the durability of concrete structures in marine engineering by the construction of Z type heterojunction and the introduction of Ru quantum dots.

In optional examples of the invention, in Step 1, the ferric salt is a ferrous inorganic salt or organic salt; preferably, the ferric salt is one of ferric nitrate, ferric chloride, ferric acetate and ferric acetyl acetate or the mixture thereof In optional examples of the invention, in Step 1, the conductive substrate is FTO conductive glass.

Before the hydrothermal reaction experiment in the present invention, the FTO conductive glass needs to be thoroughly cleaned to obtain a clean FTO conductive glass. The purpose of such operation is to improve the adhesion between the film and the FTO conductive glass.

Specifically, the clean FTO conductive glass is cleaned by the following steps: putting the FTO conductive glass into detergent-containing aqueous solution, NaOH-saturated ethanol solution, ethanol and deionized water in sequence for ultrasonic cleaning, cleaning and drying the FTO conductive glass to obtain a clean FTO conductive glass.

Optionally, the period of ultrasonic cleaning for each solution is 10-30 min (such as 10 min, 15 min, 20 min, 25 min, 30 min and interval points between any two values thereof), the drying temperature is 40-100° C. (such as 40° C., 60° C., 80° C., 100° C. and interval points between any two values thereof).

What need to explain is that the detergent can be one of the washing powder, the soap, the liquid detergent, the washing liquid.

In optional examples of the present invention, Step 1 is specifically performed as adding a mixture solution of the ferric salt and carbamide into the reactor, adding strong alkali into the reactor to adjust pH of the mixture solution, putting the clean conductive substrate into the mixture solution with the conducting surface down, heating the mixture solution for hydrothermal reaction, cooling the mixture solution and taking the conductive substrate out of the mixture solution, cleaning and drying the conductive substrate, thereby obtaining Fe$_2$O$_3$ on the conducting surface of the conductive substrate.

In the present example, the deionized water is used for cleaning; the strong alkali can be chosen as at least one of sodium hydroxide and potassium hydroxide.

In optional examples of the present invention, in Step 1, the concentration of ferric salt is 0.05 mmol/L~0.8 mmol/L(such as 0.05 mmol/L, 0.1 mmol/L, 0.5 mmol/L, 0.8 mmol/L and interval points between any two values thereof), the concentration of carbamide is 0.1 mmol/L~0.8 mmol/L (such as 0.1 mmol/L, 0.5 mmol/L, 0.8 mmol/L and interval points between any two values thereof); the concentration ratio of the ferric salt to carbamide is 1:1~1:2 (such as 1:1, 1:1.5, 1:2 and interval points between any two values thereof); pH of the mixture solution is adjusted to be 9~11 (such as 9, 10, 11 and interval points between any two values thereof); the temperature of the hydrothermal reaction is 90~200° C. (such as 90° C., 100° C., 120° C., 150° C., 180° C., 200° C. and interval points between any two values thereof), and the period of the hydrothermal reaction is 8~24 h (such as 8 h, 12 h, 15 h, 18 h, 20 h, 24 h and interval points between any two values thereof).

In optional examples of the present invention, Step 2 is specifically performed as adding aniline aqueous solution in an electrolytic tank, adding strong acid to adjust pH of the solution to obtain the electrochemical synthesis solution, the potentiostatic polymerization is conducted by using a three-electrode system where the Fe$_2$O$_3$ conductive substrate obtained in Step 1 acts as the working electrode and Ag/AgCl and Pt act as the reference electrode and the counter electrode respectively to obtain Fe$_2$O$_3$-PANI composite photoanode film. It should be noted that in the present example, the strong acid can be chosen as H$_2$SO$_4$.

In optional examples of the present invention, in Step 2, the concentration of aniline aqueous solution is 1 mmol/L~10 mmol/L (such as 1 mmol/L, 5 mmol/L, 10 mmol/L and interval points between any two values thereof), the concentration ratio of the aniline aqueous solution to the ferric salt is 1:20 or 1:10, the pH of the solution after adjustment is 1~5 (such as 1, 2, 3, 4, 5 and interval points between any two values thereof); the potential of the potentiostatic polymerization is 0.8~3.0V (such as 0.8V, 1.0V, 1.5V, 2V, 2.5V, 3.0V and interval points between any two values thereof) and the period of the potentiostatic polymerization method is 10~50 min (such as 10 min, 20 min, 30 min, 40 min, 50 min and interval points between any two values thereof).

In optional examples of the present invention, Step 3 is specifically performed as repeating operations of dropping or spin-coating the RuCl$_3$ aqueous solution onto the surface of Fe$_2$O$_3$-PANI composite photoanode film, immersing the composite photoanode film dropped and spin-coated with RuCl$_3$ aqueous solution in KBH$_4$ aqueous solution and taking the immersed solution out of the KBH$_4$ aqueous solution in a loop, finally cleaning and drying the obtained composite photoanode film to obtain Ru-Fe$_2$O$_3$-PANI composite photoanode film.

It should be noted that deionized water is used for cleaning in the present example.

In optional examples of the present invention, in Step 3, the concentration of RuCl$_3$ aqueous solution is 0.01 mmol/L~0.5 mmol/L (such as 0.01 mmol/L, 0.1 mmol/L, 0.2 mmol/L, 0.5 mmol/L and interval points between any two values thereof), the concentration ratio of RuCl$_3$ aqueous solution to the ferric salt is 8:5~10:1 (such as 8:5, 2:1, 5:1, 8:1, 10:1 and interval points between any two values thereof), the concentration of $KBH_4$ aqueous solution is 0.1 mol/L~0.8mol/L (such as 0.1 mol/L, 0.2 mol/L, 0.4 mol/L, 0.6 mol/L, 0.8 mol/L and interval points between any two values thereof), the concentration ratio of $KBH_4$ aqueous solution to the ferric salt is 1:2~5:3 (such as 1:2, 1:1, 5:3 and interval points between any two values thereof), the period of each immersion in $KBH_4$ aqueous solution is 3~5 s (such as 3 s, 4 s, 5 s and interval points between any two values thereof), and operations are repeated in a loop for 2~20 times(such as 2 times, 5 times, 10 times, 15 times, 20 times and the interval point between any two values) in a loop.

The present invention also provides a Ru-$Fe_2O_3$-PANI composite photoanode film for the photocathode protection of a reinforcing bar. The Ru-$Fe_2O_3$-PANI composite photoanode film is prepared by the above method of preparing Ru-$Fe_2O_3$-PANI composite photoanode film used for the photocathode protection of a reinforcing bar.

The present invention also provides a method for the photoelectric protection of a reinforcing bar from concrete structures in marine engineering by using the above Ru-$Fe_2O_3$-PANI composite photoanode film as a photoanode covering firm.

The Ru-$Fe_2O_3$-PANI composite photoanode film for the photocathode protection of a reinforcing bar and its preparation method are described in detail by the following examples.

EXAMPLE 1

The method of preparing Ru-$Fe_2O_3$-PANI composite photoanode film in the present example includes the following steps:

Firstly, before the hydrothermal reaction experiment, it is necessary to thoroughly clean the FTO conductive glass for the purpose of improving the adhesion between the film and the FTO conductive glass. The FTO conductive glass is put into flasks containing washing powder water, NaOH-saturated ethanol solution, ethanol and deionized water in sequence to conduct ultrasonic cleaning in the above solution for 15 mins in sequence, the ultrasonic cleaned FTO conductive glass is dried at 60° C. for later use. Then the mixture solution of 0.05 mmol/L ferric chloride and 0.1 mmol/L carbamide is added to the reactor and pH of the mixture solution is adjusted pH=9 by adding sodium hydroxide. The FTO conductive glass is put into the mixture solution with the conducting surface down. The hydrothermal temperature is controlled as 100° C. and the hydrothermal reaction period is controlled as 16 h. After cooling in the reactor, the obtained solution is cleaned and dried to obtain $Fe_2O_3$ on the conducting surface of the FTO conductive glass. Then, 1 mmol/L aniline aqueous solution is added into the electrolytic tank and the solution is adjusted pH=1 by $H_2SO_4$ to obtain the electrochemical synthesis solution. The potentiostatic polymerization is conducted at a potential of 1.2V for 10 mins by using a three-electrode system where $Fe_2O_3$ acts as the working electrode and Ag/AgCl and Pt act as the reference electrode and the counter electrode respectively to obtain $Fe_2O_3$-PANI composite photoanode film. Operations of adding 3 drops of 0.01 mmol/L $RuCl_3$ aqueous solution on the surface of $Fe_2O_3$-PANI composite photoanode film, immersing the composite photoanode film added with $RuCl_3$ aqueous solution in 0.1 mol/L $KBH_4$ aqueous solution and taking it out after 3 seconds of immersion are repeated in a loop for 10 times. The obtained composite photoanode film is washed and dried to obtain $Fe_2O_3$-PANI composite photoanode film.

Under intermittent visible light, materials of $Fe_2O_3$, $Fe_2O_3$-PANI composite photoanode film and Ru-$Fe_2O_3$-PANI composite photoanode film prepared by the present example are tested with the photoinducedcurrent-time curve (J-T curve for short). The mechanism of enhancing the photoelectric chemical property of composite materials in Ru-$Fe_2O_3$-PANI composite photoanode film is studied with J-t curve. The test curve is shown in FIG. 1. It can be seen from FIG. 1 that the photogenerated current density of Ru-$Fe_2O_3$-PANI composite photoanode film is increased to 3 times of the photogenerated current density of $Fe_2O_3$ and 2 times of the photogenerated current density of $Fe_2O_3$-PANI composite photoanode film respectively, which effectively inhibits the recombination of photogenerated carriers.

EXAMPLE 2

The method of preparing Ru-$Fe_2O_3$-PANI composite photoanode film in the present example includes the following steps:

Firstly, before the hydrothermal reaction experiment, it is necessary to thoroughly clean the FTO conductive glass for the purpose of improving the adhesion between the film and the FTO conductive glass. The FTO conductive glass is put into flasks containing soapy water, NaOH ethanol solution, ethanol and deionized water to conduct ultrasonic cleaning in the above solution for 15 mins in sequence, the ultrasonic cleaned FTO conductive glass is dried at 60° C. for later use. Then the mixture solution of 0.5 mmol/L ferric acetylacetonate and 0.5 mmol/L carbamide is added to the reactor and pH of the mixture solution is adjusted pH=10 by adding potassium hydroxide. The FTO conductive glass is put into the mixture solution with the conducting surface down. The hydrothermal temperature is controlled as 130° C. and the hydrothermal reaction period is controlled as 10 h. After cooling in the reactor, the obtained solution is cleaned and dried to obtain $Fe_2O_3$ on the conducting surface of the FTO conductive glass. Then, 10 mmol/L aniline aqueous solution is added into the electrolytic tank and the solution is adjusted pH=1.5 by $H_2SO_4$ to obtain the electrochemical synthesis solution. The potentiostatic polymerization is conducted at a potential of 1.8V for 50 mins by using a three-electrode system where $Fe_2O_3$ acts as the working electrode and Ag/AgCl and Pt act as the reference electrode and the counter electrode respectively to obtain $Fe_2O_3$-PANI composite photoanode film. Operations of spin-coating 2 drops of 0.05 mmol/L $RuCl_3$ aqueous solution on the surface of $Fe_2O_3$-PANI composite photoanode film, immersing the $RuCl_3$ aqueous solution added composite photoanode film in 0.3 mol/L $KBH_4$ aqueous solution and taking it out after 3 seconds of immersion are repeated in a loop for 20 times. The obtained composite photoanode film is washed and dried to obtain $Fe_2O_3$-PANI composite photoanode film.

Figure 2:
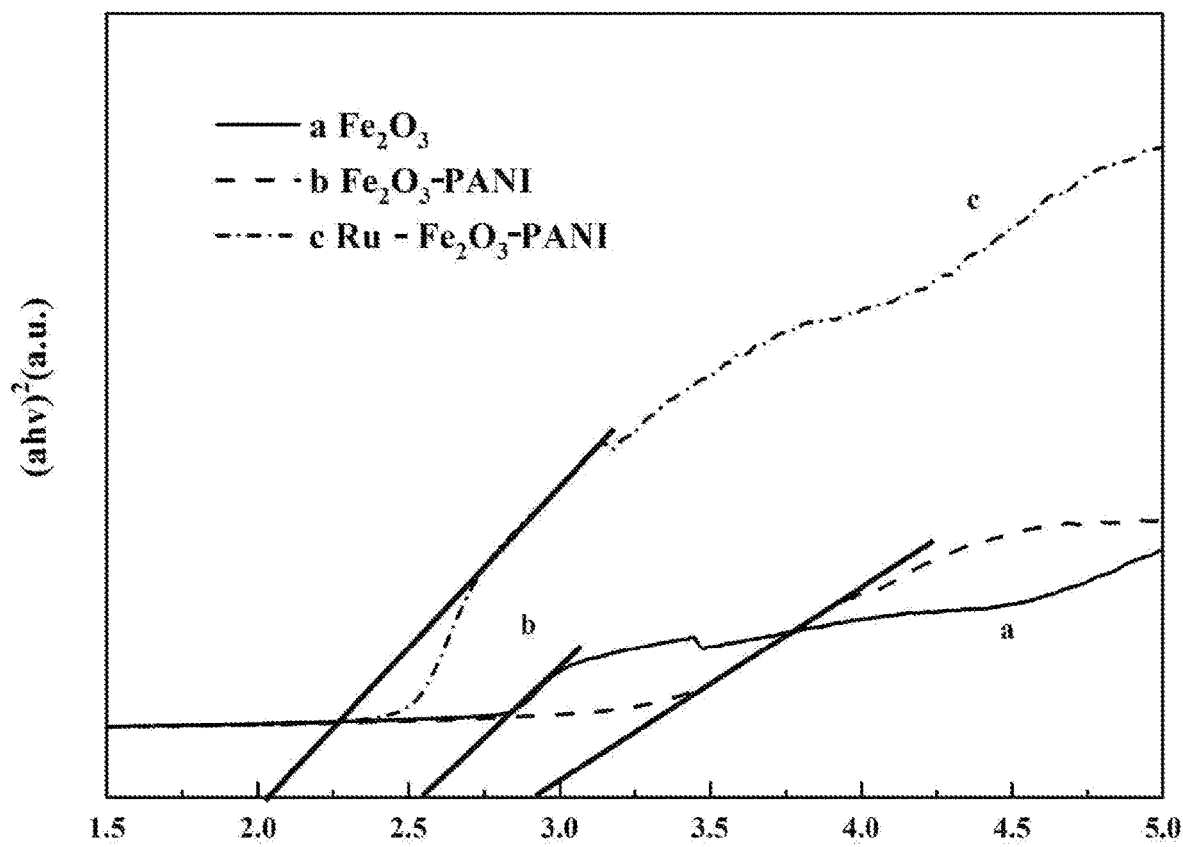
FIG. 2 is the photoresponse performance chart for $Fe_2O_3$, $Fe_2O_3$-PANI composite photoanode film and Ru-$Fe_2O_3$-PANI composite photoanode film in example 2 of the present invention, wherein $\alpha$ is absorption coefficient, $v$ is photon frequency and h is Planck constant.

$Fe_2O_3$, $Fe_2O_3$-PANI composite photoanode film and Ru-$Fe_2O_3$-PANI composite photoanode film obtained in the present example are tested with the photoresponse performance, whose band gap widths are calculated by Kubleka-Munk formula, wherein the band gap diagram is obtained after data processing, as shown in FIG. 2. The band gap width of Ru-$Fe_2O_3$-PANI composite photoanode is fitted to be about 2.1 eV while the band gap widths of $Fe_2O_3$ and $Fe_2O_3$-PANI as the control is 2.9 eV and 2.6 eV, respectively. The narrowing of band-gap width indicates that the absorption band edge is obviously red shifted, which improves the light utilization efficiency of the photoanode.

EXAMPLE 3

The method of preparing Ru-Fe$_2$O$_3$-PANI composite photoanode film in the present example includes the following steps:

Firstly, before the hydrothermal reaction experiment, it is necessary to thoroughly clean the FTO conductive glass for the purpose of improving the adhesion between the film and the FTO conductive glass. The FTO conductive glass is put into flasks containing liquid detergent aqueous solution, NaOH ethanol solution, ethanol and deionized water to conduct ultrasonic cleaning in the above solution for 15 mins in sequence, the ultrasonic cleaned FTO conductive glass is dried at 60° C. for later use. Then the mixture solution of 0.8 mmol/L ferric nitrate and 0.8 mmol/L carbamide is added to the reactor and pH of the mixture solution is adjusted pH=11 by adding sodium hydroxide. The FTO conductive glass is put into the mixture solution with the conducting surface down. The hydrothermal temperature is controlled as 200° C. and the hydrothermal reaction period is controlled as 4 h. After cooling in the reactor, the obtained solution is cleaned and dried to obtain Fe$_2$O$_3$ on the conducting surface of the FTO conductive glass. Then, 8 mmol/L aniline aqueous solution is added into the electrolytic tank and the solution is adjusted pH=4 by H$_2$SO$_4$ to obtain the electrochemical synthesis solution. The potentiostatic polymerization is conducted at a potential of 2.0V for 40 mins by using a three-electrode system where Fe$_2$O$_3$ acts as the working electrode and Ag/AgCl and Pt act as the reference electrode and the counter electrode respectively to obtain Fe$_2$O$_3$-PANI composite photoanode film. Operations of adding 10 drops of 0.5 mmol/L RuCl$_3$ aqueous solution on the surface of Fe$_2$O$_3$-PANI composite photoanode film, immersing the RuCl$_3$ aqueous solution added composite photoanode film in 0.8 mol/L KBH$_4$ aqueous solution and taking it out after 5 seconds of immersion are repeated in a loop for 2 times. The obtained composite photoanode film is washed and dried to obtain Fe$_2$O$_3$-PANI composite photoanode film.

Figure 3:
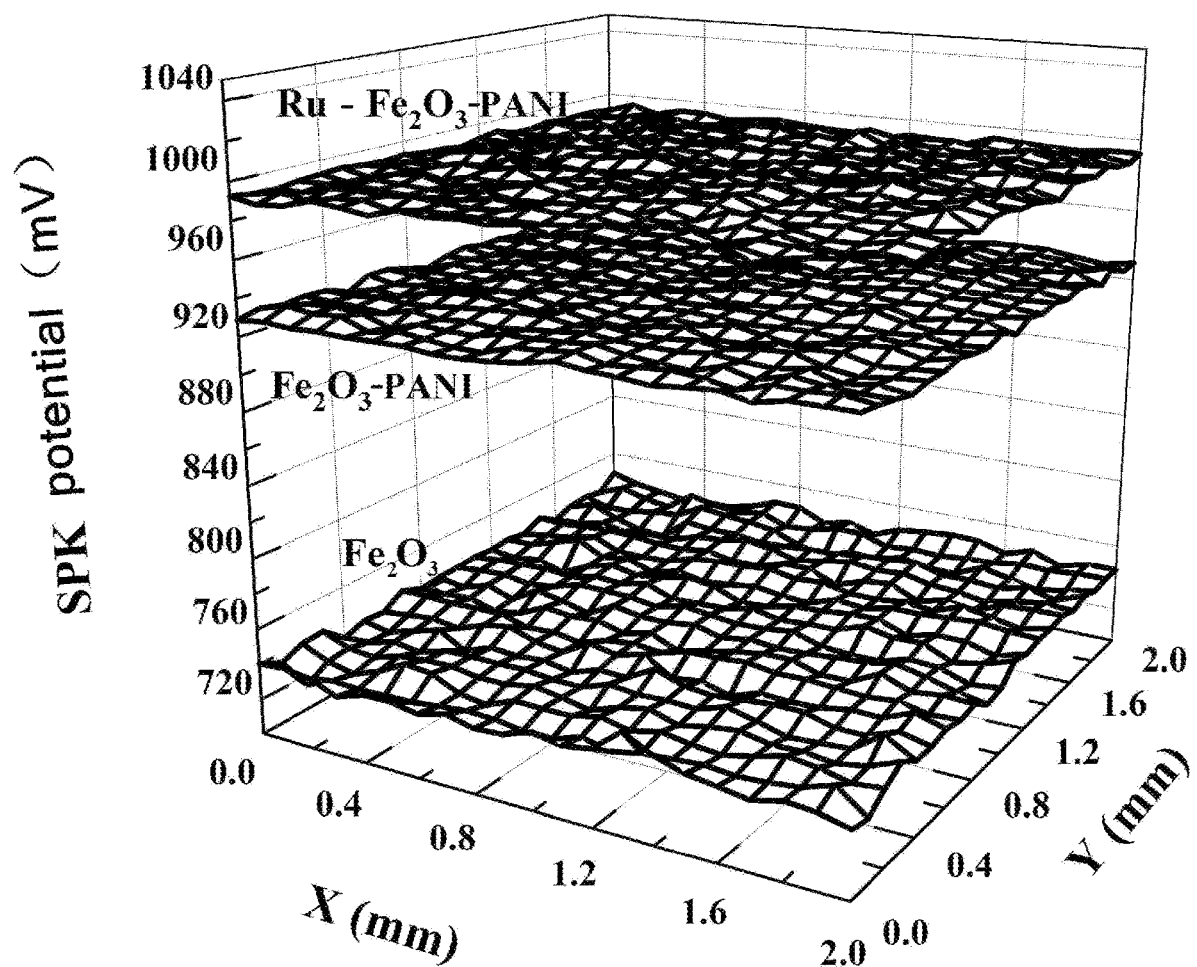
FIG. 3 is the work function map for $Fe_2O_3$, $Fe_2O_3$-PANI composite photoanode film and Ru-$Fe_2O_3$-PANI composite photoanode film in example 3 of the present invention.
Figure 4:
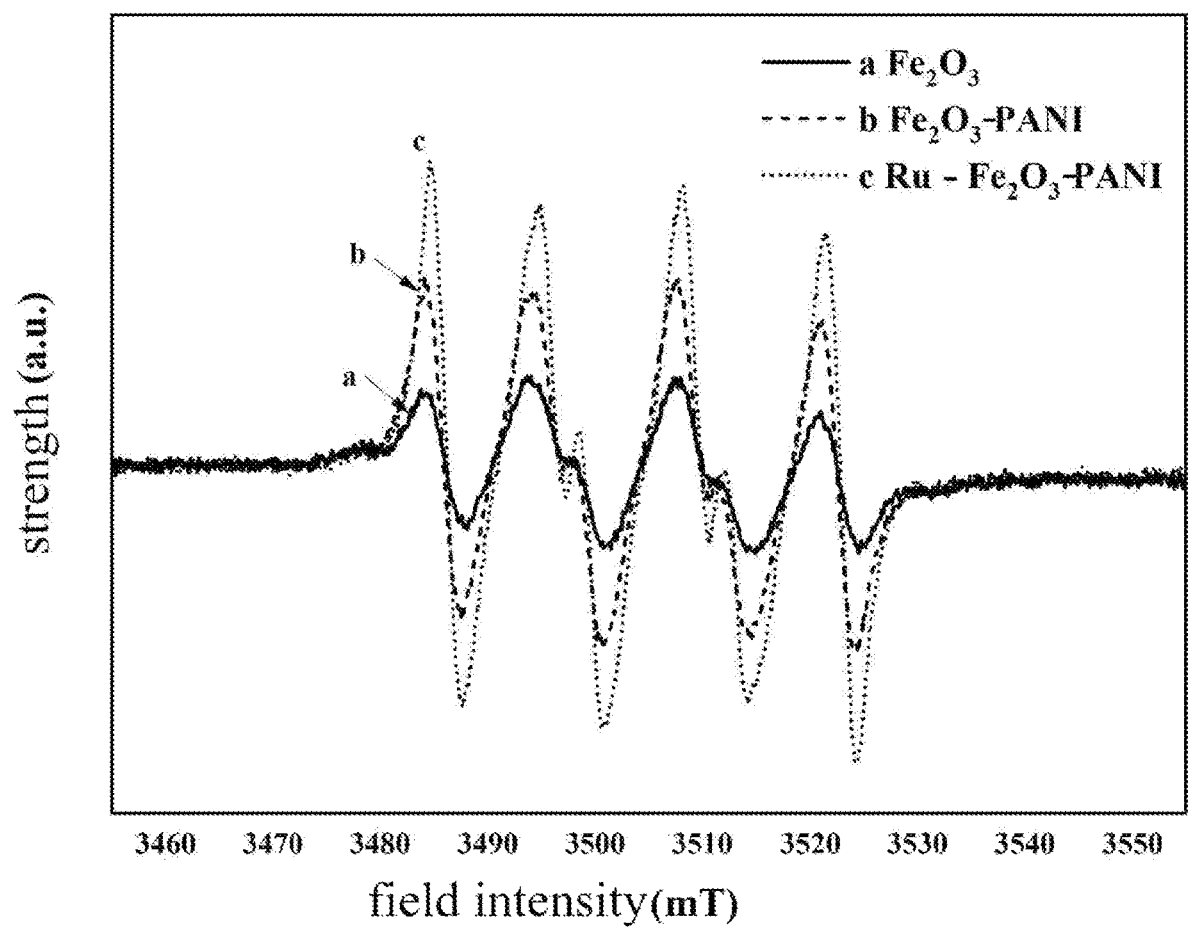
FIG. 4 is ESR (electron spin resonance) curve chart for $Fe_2O_3$, $Fe_2O_3$-PANI composite photoanode film and Ru-$Fe_2O_3$-PANI composite photoanode film in example 3 of the present invention.

Fe$_2$O$_3$, Fe$_2$O$_3$-PANI composite photoanode film and Ru-Fe$_2$O$_3$-PANI composite photoanode film obtained in the present example are tested with the work function, wherein the test results are shown in FIG. 3. As can be seen from FIG. 3, SKP potential of Fe$_2$O$_3$ and Fe$_2$O$_3$-PANI is 740 mV and 930 mV respectively while SKP potential of Ru-Fe$_2$O$_3$-PANI composite photoanode film is 990 mV. Based on the fact that the value of the work function is equal to the negative number of the difference between SKP potential value and 450, work functions of Fe$_2$O$_3$, Fe$_2$O$_3$-PANI composite photoanode film and Ru-Fe$_2$O$_3$-PANI composite photoanode film are −290 eV, −480 eV and −540 eV, respectively. A lower work function means that electrons are more likely to escape from the material surface and transfer to the surface of a protected reinforcing bar. In addition, ESR curve shows (as shown in FIG. 4) that compared with Fe$_2$O$_3$ and Fe$_2$O$_3$-PANI alone, Ru-Fe$_2$O$_3$-PANI composite photoanode film has a higher tested signal intensity, indicating that the composite film can catalyze the reduction of oxygen negative free radicals more effectively. This result also indicates that the conduction potential of Ru-Fe$_2$O$_3$-PANI is lower and it can transfer photogenerated electrons to the surface of a reinforcing bar.

In summary, the Ru-Fe$_2$O$_3$-PANI composite photoanode film obtained by the present invention can achieve visible light absorption and significantly improve the light utilization efficiency. The photogenerated current density of Ru-Fe$_2$O$_3$-PANI is increased to 3 times of the photogenerated current density of Fe$_2$O$_3$ and 2 times of the photogenerated current density of Fe$_2$O$_3$-PANI respectively, which effectively inhibits the recombination of photogenerated carriers. Compared with Fe$_2$O$_3$ and Fe$_2$O$_3$-PANI alone, the work function of the inorganic-organic heterojunction Ru-Fe$_2$O$_3$-PANI composite photoanode film constructed by the present invention has a large negative shift, which can provide photocathode protection current for a reinforcing bar with a negative self-corrosion potential from concrete structure in marine engineering and prolong the service life of marine engineering structures.

The invention claimed is:

1. A method of preparing Z-type heterojunction photoanode film used for the photocathode protection of a reinforcing bar, the method includes the following steps:

step 1, adding a mixture solution of a ferric salt and carbamide into a reactor, adding an alkali to adjust pH of the mixture solution, putting a conductive substrate with a conducting surface faced downward into the mixture solution, heating the mixture solution for a hydrothermal reaction, taking the conductive substrate out after the reactor is cooled down, and then washing and drying the conductive substrate, thereby obtaining Fe$_2$O$_3$ on the conducting surface of the conductive substrate;

step 2, adding a phenylamine aqueous solution into to an electrolytic tank, then adding an acid to adjust pH of the phenylamine aqueous solution, thereby obtaining an electrochemical synthesis solution, conducting potentiostatic polymerization in the electrochemical synthesis solution by using a three-electrode system where the conductive substrate obtained in the step acts as a working electrode and Ag/AgCl and Pt respectively act as a reference electrode and a counter electrode, thereby resulting in polyaniline depositing on the conductive substrate obtained in the step 1 to prepare a F$_e$2$_o$3-polyaniline (PANI) composite photoanode film;

step 3, dropping or spin-coating RuCl$_3$ aqueous solution on a surface of the Fe$_2$O$_3$-PANI composite photoanode film, immersing the Fe$_2$O$_3$-PANI composite photoanode film dropped or spin-coated with the RuCl$_3$ aqueous solution in KBH$_4$ aqueous solution and then taking the Fe$_2$O$_3$-PANI composite photoanode film out of the KBH$_4$ aqueous solution, repeating operations of dropping or spin-coating, immersing and taking the Fe$_2$O$_3$-PANI composite photoanode film out of the KBH$_4$ aqueous solution in a loop for 2 to 20 times prior to washing and drying to obtain a Ru-Fe$_2$O$_3$-PANI composite photoanode film which is the Z-type heterojunction photoanode film.

2. The method of preparing Z-type heterojunction photoanode film used for the photocathode protection of a reinforcing bar according to claim 1, wherein the ferric salt is an iron-containing inorganic salt or organic salt, in step 1, the conductive substrate is a fluorine-doped tin oxide (FTO) FTO conductive glass and the FTO conductive glass is washed by the following steps:

putting the FTO conductive glass into each of a detergent-containing aqueous solution, a NaOH saturated ethanol solution, an ethanol solution and deionized water in sequence for ultrasonic cleaning prior to washing and drying to obtain the a clean FTO conductive glass.

3. The method of preparing Z-type heterojunction photoanode film used for the photocathode protection of a reinforcing bar according to claim 1, wherein in step 1, a concentration of the ferric salt is 0.05 mmol/L-0.8 mmol/L, a concentration of carbamide is 0.1 mmol/L-0.8 mmol/L, a concentration ratio of the ferric salt to the carbamide is 1:1-1:2, pH of the mixture solution after adjustment is 9-11, a temperature of the hydrothermal reaction is 90-200° C. and a reaction period of the hydrothermal reaction is 8-24 h.

4. The method of preparing Z-type heterojunction photoanode film used for the photocathode protection of a reinforcing bar according to claim 1, wherein in step 2, a concentration of the phenylamine aqueous solution is 1 mmol/L-10 mmol/L, a concentration ratio of the phenylamine aqueous solution to the ferric salt is 1:20 or 1:10, pH of the solution after adjustment is 1-5, potential of the potentiostatic polymerization is 0.8-3.0V and a period of the potentiostatic polymerization is 10-50 min.

5. The method of preparing Z-type heterojunction photoanode film used for the photocathode protection of a reinforcing bar according to claim 1, wherein in step 3, a concentration of $RuCl_3$ aqueous solution is 0.01 mmol/L-0.5 mmol/L, a concentration ratio of the $RuCl_3$ aqueous solution to the ferric salt is 8:5-10:1, a concentration of $KBH_4$ aqueous solution is 0.1 mol/L-0.8 mol/L, a concentration ratio of the $KBH_4$ aqueous solution to the ferric salt is 1:2-5:3, a period for each immersion in the $KBH_4$ aqueous solution is 3-5 s.

\* \* \* \* \*